Aug. 3, 1948.  G. F. McDOUGALL  2,446,337
TURN SIGNAL CONTROL FOR VEHICLES
Filed April 16, 1945
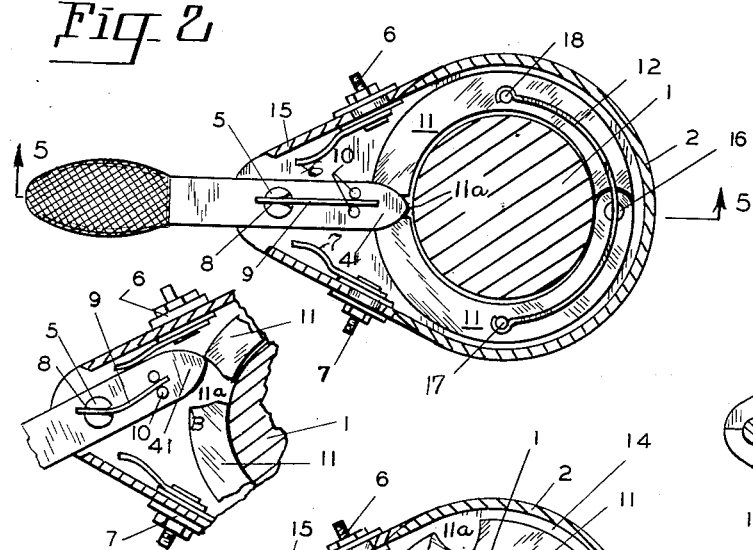
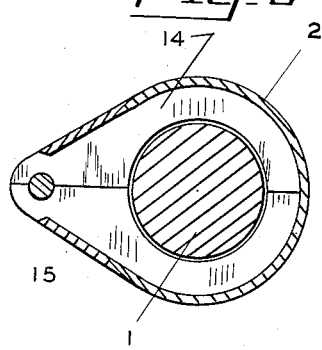
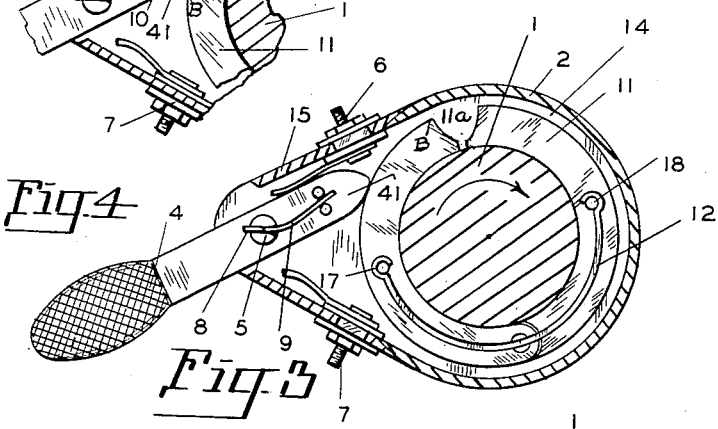
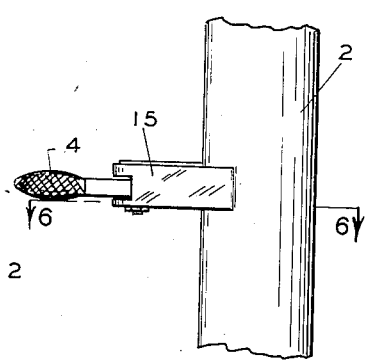
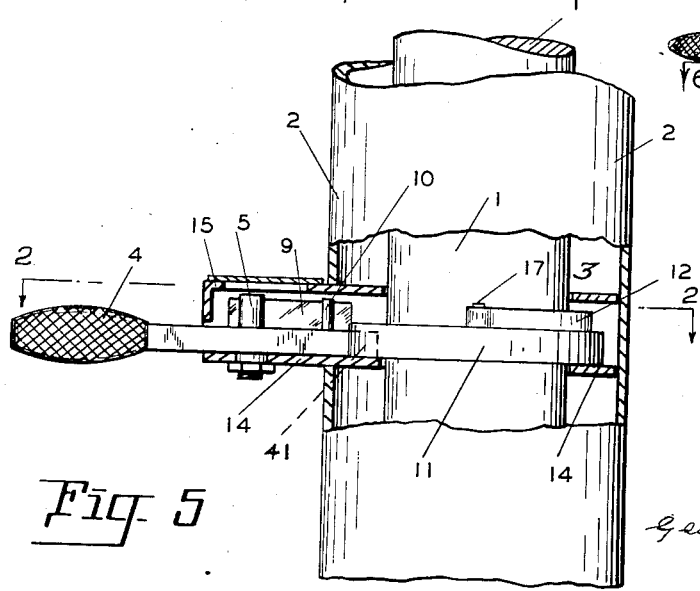
INVENTOR.
George F. McDougall.

Patented Aug. 3, 1948

2,446,337

UNITED STATES PATENT OFFICE 2,446,337

TURN SIGNAL CONTROL FOR VEHICLES

George F. McDougall, Portland, Oreg.

Application April 16, 1945, Serial No. 588,542

8 Claims. (Cl. 200—59)

This invention relates to a manually operable turn signal for vehicles that will automatically cancel the signal when the turn approaches completion and the front wheels are started to straighten. It is necessarily attached to the steering column. A very large number of signals that answer to the general description above given have been made and several varieties are now in use but they lack something of satisfying the objects named below.

The objects of the present invention are first to produce a signal operating means that operates identically, whether the steering column of an auto vehicle turns clockwise or counterclockwise in making the turn. This object has been satisfied by other structures.

It is another object to produce a signal operating means that is manually turned to operate right or left turn signal, before the turning point is reached, thereafter operating responsively to the steering shaft movement, without having or requiring any pins, projecting parts or special machining of the steering shaft whatever; which, it is believed, has not been done before.

Another object is to produce a signal operating means having the least number of operating parts and those requiring little or no machining, in particular no lathe work, in order to reduce the cost.

Another object is a signal operating means operable to be "set" "at least fifty feet before the turn is started" as laws and ordinances require and that will remain on until the turn is well made and then go off automatically, unless it is in the hands of that dangerous driver who thinks it is necessary to veer clear over to the wrong side of the road before starting to turn. It is not for him.

Another object is an appliance of the sort that eliminates the danger of broken parts dropping down into the annular space between the steering shaft and its stationary envelope, the "steering column," to cause trouble.

I accomplish the stated objects and others that will be apparent by the signal operating means shown in six views in the accompanying drawing, in which—

Fig. 1 is a short section of a steering column, taken just below the wheel showing the signal operating means on the column in easy reach of the driver.

Fig. 2 is a section of Fig. 5 on the plane 2—2 of the figure.

Fig. 3 is another view of the same structure shown in Fig. 2 wherein the steering shaft has been started to turn after the signal operating means has been manually set.

Fig. 4 is a fragmentary view of the structure shown in Figs. 2 and 3 showing the relative positions of the split ring and the operating lever that they will occupy during the interval after the lever has been set for a turn and before the steering shaft has been turned.

Fig. 5 is a section of Fig. 2 on the line 5—5 of that figure.

Fig. 6 is a section of Fig. 1 on the line 6—6 of that figure.

Further describing the drawings: Numeral 1 is a steering shaft nearly always slantingly mounted in a driver's compartment, 2 is the steering column as it is called, being a tubular member within which the shaft 1 is revolubly mounted, with an annular space 3 between them. This is believed to be standard construction.

The operating parts of the signal setting device are the lever 4, pivotally mounted at 5, therefore manually movable to establish electric contact with the terminals 6 and 7, which are flexible and will maintain contact through considerable movement of the lever 4. The pivot 5 is shown slotted at 8 to contain the flat spring 9, which being slidably positioned between the pins 10, biases the lever 4 to median position, being that shown in Fig. 2; in which position its nose 41 forcibly separates the two parts of the hinged, split, expansible-contracting ring 11, separating those parts by entering the notch 11a, so that they no longer frictionaly grip the steering shaft 1 under influence of the spring 12, which is being done in Figures 3 and 4.

Fig. 6 shows the two part closure 14 for the housing 15, which extends through a suitable opening in the tubular member 3, and being slipped into place, one piece at a time, completely closes the annular space below the point where the section line 6—6 is shown in Fig. 1. This is an effective preventive of any parts falling downwardly. The parts are then attached to the housing 15 by any convenient fastenings. The split ring 11 is hinged at 16 and the spring 12 engage pins such as 17 and 18, tending to make the two parts frictionally grip the shaft 1, save when the ring 11 is opened by the nose 41 of the lever 4.

The operation of the signal setting device is now completely apparent. The lever 4 being in normal (Fig. 2) position, the expansible-contracting ring 11 has no influence on the steering shaft 1, which may be operated as if it did not exist.

When the driver sets the lever 4, at his choice for right or left turn signal, it throws the ring 11 in the same direction that the nose 41 moves, the expansible-contracting ring 11 makes a very small part of a revolution and the nose portion 41 of the lever 4, engaged with the notch 11a which forced it to revolve that small portion, rests on the boundary B beneath it. The ring 11 grips the shaft 1, turning with the shaft as many revolutions as are needful to make the turn without further effect on the lever 4 except to hold it in contact with the selected terminal. Fragmentary Fig. 4 shows the nose 41 of the lever 4 just before it is released from manual pressure, therefore not resting on the ring 11, where it will rest by influence of the spring 9 as soon as released. Upon the notch passing under the nose 41 in succeeding revolutions of the shaft 1, there will be a slight drop of the nose 41 into the notch 11a as is needful for reengaging the parts upon reversal of the shaft 1, but the flexibility of the contacts 6 and 7 prevents interruption of the signal.

The foregoing description of the mode of operation is identical if an opposite signal had been made and the lever 4 moved the opposite direction to close the other switch such as 7. A wire or suitable electrical connection from 6 and 7 to independent signals will be presumed as that is well known; also the lever 4 completes the electric circuit by grounding it to the frame of the machine as is standard practice in automobiles.

The nose 41 will re-engage the notch 11a upon reversal of the shaft 1, expanding the ring 11 and relieving the frictional contact with the shaft 1. As indicated by its shortness, the spring 9 has considerably more power than the spring 12 and as soon as frictional contact of the ring 11 is canceled, it will move the ring to the position shown in Fig. 2. The relative expansion of the ring need not be more than two or three thousandths to cancel friction.

The notch will, of course, stop whenever the shaft 1 stops turning; hence may be in any position when reverse movement of the shaft starts to straighten out and permutation tells us that the average reverse motion of the shaft 1 to cancel the signal will be slightly less than one half turn.

To apply the signal setting device to a steering column already slotted to receive it, the part 14 can be set in, one part at a time, and then turned to mate; then the ring 11 with its spring put in reversely and turned. It will be seen from Fig. 5 that there is no tendency or in fact opportunity for the parts within the annular space between the shaft and the column to come apart; but if they should break because of hidden flaws, nothing can fall below.

Having fully shown and described my invention so that those skilled in the art to which it appertains, can make and use it, what I claim as new and desire to secure by Letters Patent, is:

1. Signal switch operating means for a column containing a shaft, comprising a pivoted switch lever biased to off position and selectively movable to opposite switch closing positions, said lever having a nose, a split expansible contracting ring mounted on the shaft and provided with a notch for engaging said nose to expand when the lever is in off position, the said ring contractable on the shaft when the lever is moved to close a switch, to grip the shaft and rotate with it when the shaft is moved in correspondence with movement of the lever and upon reversal of the shaft to reengage the nose and expand loose on the shaft.

2. An electric turn signal operator in which a lever is selectively movable to close switches, characterized by a switch operating lever, said lever biased to median neutral position, oppositely placed switches selectively closable by said lever upon movement thereof, said lever having a nose, an expansible contracting ring, said ring mounted on a steering shaft, effective to grip the shaft, revolve therewith and hold the lever in switch closing position, said ring having a notch engageable with said nose to expand the ring free of the shaft when the shaft is reversed.

3. Turn signal switch operating means for a steering column containing a shaft, comprising a pivoted switch lever biased to off position and selectively movable to opposite switch closing positions, a nose on said lever, a split expansible contracting ring, said ring mounted on the said shaft and said ring provided with a notch for engaging said nose when the lever is in off position, means for causing said ring to contract and grip the shaft and revolve therewith when the nose is moved out of off position, said ring effective to retain the lever in selected switch operating position until the rotation of the shaft is reversed and said nose enters the notch upon reverse movement of the shaft and ring.

4. Right and left turn indicator operating means for electric signals, comprising a lever having a handle portion and a nose portion, said lever biased to median position and pivotally mounted adjacent a steering shaft, electric switches selectively closable by opposite manual movement of said lever, an expansible-contracting ring, said ring provided with a nose-containing notch, said ring mounted on said shaft, means causing said ring to grip said shaft to turn with it when the lever is in switch closing position, said ring concurrently effective to hold the lever in selected position until the shaft is reversed and the nose enters the notch.

5. A manually settable turn signal control for vehicles of the steering post steering shaft type including electrical switches for selectively energizing signals with automatic means for canceling the signal when no longer needed, comprising an expansible-contracting ring, means for causing said ring to contract into gripping engagement with the shaft when a signal is initiated, said ring provided with a notch and the said lever having a mating nose, so formed that when the shaft is moved to make the turn as signaled, the ring supports the lever in signal making position and upon reversal of the shaft cancels the turn, the nose reenters the notch to expand the ring, carrying the lever to neutral position.

6. In a steering shaft directional turn signal operating device, an expansible contracting annular friction ring for surrounding the steering shaft, spring means biasing said ring to shaft gripping position, said ring provided with a notch on one side, a pivotally mounted lever with a notch engaging nose, said nose positioned to enter said notch and cancel the grip of said ring by expanding the same, said lever so proportioned that upon movement thereof the nose will leave the notch and rest on the perimeter of said ring until the signal is executed, reenter the notch and cancel the signal upon reverse movement of the steering shaft.

7. A manually operable signaling device for vehicles equipped with a steering shaft, comprising a selectively movable signal lever normally biased to no signal position, an expansible contracting ring provided with a notch through its perimeter, said ring for mounting on a steering shaft, said ring biased to frictionally grip said shaft, said signal lever formed with a part that is cooperative with said ring to ride its perimeter when a selected signal is being executed, said part effective to enter the said notch and expand said ring free of the shaft and concurrently permit the bias of the lever to cancel the signal.

8. A turn signal operating means for vehicles having a steering shaft, comprising an oppositely disposed pair of electrical switches, a lever pivotally mounted to selectively close one of the switches at a time, a nose portion on said lever, said lever biased to neutral position, characterized by an expansible contracting annular ring mounted on said shaft, said ring provided with a notch for normally containing said nose portion, said nose effective to ride the perimeter of said ring and hold the lever against its bias whenever the lever is selectively moved and while the shaft is correspondingly turned and to re-enter said notch and expand the ring free of the shaft when the shaft is reversely turned.

GEORGE F. McDOUGALL.